UNITED STATES PATENT OFFICE.

NATHAN SULZBERGER, OF NEW YORK, N. Y.

PROCESS OF PREPARING SCOURING AND OTHER HOUSEHOLD SOAPS CONTAINING FULLERS' EARTH.

951,155.  Specification of Letters Patent.  Patented Mar. 8, 1910.

No Drawing.  Application filed August 5, 1909. Serial No. 511,437.

*To all whom it may concern:*

Be it known that I, NATHAN SULZBERGER, a citizen of the United States of America, residing at No. 34 West Seventy-first street, New York city, in the county of New York and State of New York, have invented new and useful Improvements in Processes of Preparing Scouring and other Household Soaps Containing Fullers' Earth, of which the following is a specification.

I have found that fullers' earth is well adapted as a scourer and filler or loader in the manufacture of soaps, especially household and family soaps, such as for instance soaps technically known as "brown household soaps," laundry soaps, textile and scouring soaps and certain varieties of toilet and medical soaps. Spent fullers' earth, which has been used in deodorizing and decoloring substances of an oily and fatty nature is even more advantageously used in the manufacture of these soaps, since the same contains varying percentages of the fatty material, in the treatment of which it was employed. This spent fullers' earth containing such fatty substances cannot be freed again completely of such fatty substance or economically enough to pay for the expense. Therefore the amount of fatty material retained by such spent fullers' earth is today more or less considered a waste and loss, which fatty materials however, in my process enter into the soap either in a saponified or unsaponified condition. In my new process however, I again make commercially valuable the amount of fatty and oily substances which the fullers' earth, which has been used in the treatment of fats and oils, retains, since in using such spent fullers' earth as a scourer and filler in the manufacturing of soaps etc. I add these retained amounts of fatty and oily substances to the saponifiable material used in these soaps. As an example, when using fullers' earth in the manufacture of soaps, according to my invention, which earth has served to deodorize and decolorize cotton seed oil, I add, by using such spent fullers' earth incidentally with the same, to the soap stock such amounts of cotton seed oil, which the earth has retained from having been employed in deodorizing and decolorizing cotton seed oil—this amount being generally around about 10%, figured on the weight of the spent fullers' earth. For many purposes I prefer to use upward of 10% of the spent fullers' earth.

As a specific example, in order to illustrate my invention I cite the following: Twenty pounds of Russian bean oil were saponified with the necessary amount of caustic potash, dissolved in about twenty pounds of water, to produce a neutral soap; after complete saponification at about 70 to 80 degrees C., about 10 pounds of spent fullers' earth, which had been used in the refining of lard and which contain about 10% (of the weight of the spent fullers' earth) of lard, were added to the hot soap stock, after there had been mixed into the soap and before the addition of the spent fullers' earth, a slight excess over the amount of caustic potash (dissolved in about three pounds of warm water) necessary to saponify the lard, contained in the spent fullers' earth to be added. A soap of yellowish brown color was obtained, which proved especially valuable in washing varnished and painted surfaces, possessing detergent and abrasive properties without scratching. The amounts of fullers' earth may be materially increased especially when additional amounts of water are added. If sufficient amounts of fullers' earth are added and caustic soda is used, the finished products may be pressed into the form of a brick.

Fullers' earth and also particularly the same after having been used in the treatment of fats and oils, is also a valuable ingredient in the manufacturing of "soap emulsions", which contain in addition to soap certain larger or smaller amounts of unsaponifiable material as for instance mineral oils, and which are used extensively in washing and scouring painted and varnished surfaces. The small specific gravity of fullers' earth enables it to remain in suspension in such emulsions, which is one of the desired properties of a scourer and filler for this purpose.

I claim:

1. Process for manufacturing scouring and other household soaps of the nature herein disclosed consisting in adding fullers' earth, which has been used in treating substances of a fatty and oily nature, as a scourer and filler to the soap material.

2. Process for manufacturing, scouring and other household soaps of the nature herein disclosed consisting in adding fullers' earth, which has been used in deodorizing and decoloring cottonseed oil, as a scourer and filler to the soap material.

3. Process for manufacturing emulsions containing soap and also unsaponifiable material of the nature herein disclosed consisting in adding spent fullers' earth as a scourer and filler to such emulsions.

NATHAN SULZBERGER.

Witnesses:
ALBERT NATHAN.
MAX S. WEIL.